United States Patent
Wu et al.

(10) Patent No.: US 11,329,377 B2
(45) Date of Patent: May 10, 2022

(54) ANTENNA CALIBRATION DEVICE

(71) Applicant: CommScope Technologies LLC, Hickory, NC (US)

(72) Inventors: Bo Wu, Suzhou (CN); Ligang Wu, Suzhou (CN); Runmiao Wu, Suzhou (CN); Jian Zhang, Suzhou (CN)

(73) Assignee: CommScope Technologies LLC, Hickory, NC (US)

(*) Notice: Subject to any disclaimer, the term of this patent is extended or adjusted under 35 U.S.C. 154(b) by 517 days.

(21) Appl. No.: 16/423,312

(22) Filed: May 28, 2019

(65) Prior Publication Data
US 2019/0372221 A1 Dec. 5, 2019

(30) Foreign Application Priority Data
May 31, 2018 (CN) .......................... 201810548253.0

(51) Int. Cl.
*H01Q 3/36* (2006.01)
*H01Q 3/26* (2006.01)

(52) U.S. Cl.
CPC .............. *H01Q 3/36* (2013.01); *H01Q 3/267* (2013.01)

(58) Field of Classification Search
CPC .. H01Q 3/36; H01Q 3/267; H01P 5/12; H01P 5/16; H01P 5/18; H01P 5/184; H01P 5/185; H01P 5/186
See application file for complete search history.

(56) References Cited

U.S. PATENT DOCUMENTS

| 2013/0265203 A1* | 10/2013 | Ermutlu | H01Q 9/0457 343/703 |
| 2014/0203960 A1* | 7/2014 | Huang | H01P 5/12 342/175 |

FOREIGN PATENT DOCUMENTS

| EP | 0291694 A1 * | 11/1988 | ............. H01P 5/186 |
| WO | 2017/202536 A1 | 11/2017 | |

OTHER PUBLICATIONS

Notification of Transmittal of the International Search Report and the Written Opinion of the International Searching Authority, or the Declaration corresponding to International Application No. PCT/US2019/034238, dated Aug. 23, 2019, 12 pgs.

* cited by examiner

*Primary Examiner* — Vladimir Magloire
*Assistant Examiner* — Oladimeji Oyegunle
(74) *Attorney, Agent, or Firm* — Myers Bigel, P.A.

(57) ABSTRACT

A coupling device includes a plurality of couplers. Each coupler includes a transmission main line and a coupling subline. The transmission main line is used for providing an input end and an output end. The coupling subline is coupled with the transmission main line to provide two coupling ends. The coupling subline includes two first parts located on opposite sides of the transmission main line and a second part connected between the two first parts. The coupling sublines of the plurality of couplers are connected in series to provide a first coupling output port and a second coupling output port. The first part of the coupling subline of at least one of the plurality of couplers has a shared section with the second part of the coupling subline of an adjacent one of the plurality of couplers.

20 Claims, 4 Drawing Sheets

ANTENNA CALIBRATION DEVICE

CROSS-REFERENCE TO RELATED APPLICATION

The present application claims priority under 35 U.S.C. § 119 to Chinese Patent Application No. 201810548253.0, filed May 31, 2018, the entire content of which is incorporated herein by reference as if set forth in its entirety.

FIELD OF THE INVENTION

The present invention generally relates to antennas and, more particularly, to a multi-channel calibration device for an antenna array.

DESCRIPTION OF RELATED ART

Adaptive antenna arrays that include a plurality of radiating elements are widely used in modern mobile communication systems. These antenna arrays are often referred to as "smart" antennas. By adjusting the amplitude and phase characteristics of radio frequency ("RF") signals transmitted to the radiating elements, a smart antenna can generate spatially directional radiation patterns or "antenna beams" that can be directed to cover a selected area or to point at individual users. The use of smart antennas may significantly improve the capacity and link quality of a communication system.

Smart antennas include beamforming networks that adjust the amplitude and/or phase of the RF signals that are passed to the radiating elements. In a base station including a smart antenna, signals transmitted by an RF transceiver enter the beamforming network through an RF port. In the beamforming network, the signals are divided into sub-components that travel along multiple paths (which are also referred to as "channels") that correspond to multiple radiating elements or to multiple groups (e.g., columns) of radiating elements. The signals in each path undergo independent adjustments of their amplitude and phase characteristics (which is referred to as "beamforming"). The beamformed signals along the multiple paths are passed to the corresponding radiating elements or corresponding groups of radiating elements. Each radiating element or each group of radiating elements generates an independent, spatially directional beam. After interference and superimposition of the independent beams, the resulting composite antenna beam may exhibit good directivity.

In order to form a desired antenna beam, it is desirable to make sure that transmission/reception paths from the RF transceiver to the radiating elements or columns of radiating elements are uniform in terms of their amplitude and phase characteristics, so that the composite antenna beam may have the shape and characteristics of the antenna beam that is expected to be obtained by adjustment of the beamforming network. However, in practice it can be difficult to ensure that the characteristics of the multiple transmission/reception paths are uniform, and any differences between the paths may seriously degrade the performance of the smart antenna. Thus, calibration devices may be used to identify and compensate for differences between the multiple paths.

Calibration devices are known in the art that collect respective portions of the signals traversing each transmission/reception path and output the collected energy at a calibration port of the antenna. FIG. 1 is a schematic diagram illustrating the basic structure and principle of such a prior art calibration device 20. The calibration device 20 in FIG. 1 is implemented in an antenna having an antenna array that includes eight radiating units 10. Each radiating unit 10 may include one radiating element or a vertical column of radiating elements. For an antenna having eight radiating units 10, the calibration device 20 may include eight signal input ports 11. Each signal input port 11 is connected to a corresponding RF transceiver (not shown) via a beamforming network. In a transmission mode, each RF transceiver of the antenna may output a subcomponent of the RF signal to be transmitted. The subcomponent of the RF signal arrives at a corresponding input port 11 via the beamforming network to be input to the calibration device 20. At the calibration device 20, each subcomponent of the RF signal is transferred to a corresponding output port 12 through a corresponding transmission line 13 that pass the subcomponents to the corresponding radiating units 10.

In order to collect a portion of the signals passing through the transmission lines 13 from the signal input ports 11 to the radiating units 10, the calibration device 20 may include eight directional couplers 22. Each directional coupler 22 is a four-port device. The calibration device 20 further includes cascaded power combiners 24 that combine the outputs of the eight directional couplers 22 and connect those outputs to a single calibration port 25. The directional couplers 22, together with the cascaded power combiners 24, form a calibration network between the radiating units 10 and the calibration port 25. In a calibration operation for, e.g., a transmission path, a calibration test signal may be transmitted by the RF transceivers. The calibration test signal is transferred through the beamforming network and input to the calibration device 20 at corresponding input ports 11. A small part of the power of each subcomponent of the calibration test signal is output by a corresponding directional coupler 22 through its coupling port 23, and is then transferred to the cascaded power combiners 24. For an antenna having eight radiating units 10, the cascaded power combiners 24 may be a 3-stage cascade Wilkinson power divider circuit that is configured to combine the coupling signals output by the coupling ports 23 in pairs and ultimately combine the signals as a composite calibration test signal. The composite calibration test signal is output from the calibration device 20 via the calibration port 25. The calibration port 25 may be connected to a calibration transceiver. The calibration transceiver may compare the composite test signal with a reference test signal so as to be capable of detecting the uniformity of amplitude/phase of various transmission paths. Based on the comparison, the amplitude and/or phase characteristics of the signal components on the transmission paths can be adjusted to compensate for the difference in amplitude/phase between the transmission paths so as to achieve a desired radiation pattern.

When there is a large number of radiating units, the prior art calibration device includes a large number of couplers and power combiners. Thus the size of the calibration device may be very large, making the calibration device hard to satisfy the requirement of highly integration and miniaturization of the antennas.

Moreover, the calibration network, which is composed of couplers and power combiners, may itself introduce non-uniformities in amplitude/phase between paths. When a non-uniformity is observed at the calibration port, it may not be possible to determine whether the non-uniformity is caused by the beamforming and feeding network between the RF transceiver and the radiating units or by the calibration network between the radiating units and the calibration port.

When radiating units in an antenna array are used for services in different frequency bands (i.e., two or more frequency bands), the beamforming networks for different frequency bands need to be calibrated separately. Thus it is necessary to scale up a single calibration port into a plurality of calibration ports to calibrate the beamforming networks for the different frequency bands separately.

SUMMARY OF THE INVENTION

It is an object of the invention to provide a coupling device, an antenna calibration device, and an antenna device that overcomes at least one of the deficiencies in the prior art.

According to a first aspect of the present disclosure, a coupling device is provided. This coupling device includes a plurality of couplers. Each coupler includes a transmission main line and a coupling subline. The transmission main line is used for providing an input end and an output end. The coupling subline is coupled with the transmission main line to provide two coupling ends. The coupling subline includes first and second parts located on opposite sides of the transmission main line and a third part connected between the first and second parts. The coupling sublines of the plurality of couplers are connected in series to provide a first coupling output port and a second coupling output port. The first part of the coupling subline of at least one coupler has a shared section with the third part of the coupling subline of an adjacent coupler.

According to a second aspect of the present disclosure, an antenna calibration device is provided. The antenna calibration device includes a first power allocating part and a coupling device. This coupling device includes a plurality of couplers. Each coupler includes a transmission main line and a coupling subline. The transmission main line is used for providing an input end and an output end. The coupling subline is coupled with the transmission main line to provide two coupling ends. The coupling subline includes first and second parts located on opposite sides of the transmission main line and a third part connected between the first and second parts. The coupling sublines of the plurality of couplers are connected in series to provide a first coupling output port and a second coupling output port. The first part of the coupling subline of at least one coupler has a shared section with the third part of the coupling subline of an adjacent coupler. The coupling device is connected to a first power allocating part via the first coupling output port. The first power allocating part provides a plurality of first calibration ports.

According to a third aspect of the present disclosure, an antenna calibration device is provided. The antenna calibration device includes a plurality of directional couplers and a coupling device. The coupling device includes a plurality of couplers. Each coupler includes a transmission main line and a coupling subline. The transmission main line is used for providing an input end and an output end. The coupling subline is coupled with the transmission main line to provide two coupling ends. The coupling subline includes first and second parts located on opposite sides of the transmission main line and a third part connected between the first and second parts. The coupling sublines of the plurality of couplers are connected in series to provide a first coupling output port and a second coupling output port. The first part of the coupling subline of at least one coupler has a shared section with the third part of the coupling subline of an adjacent coupler. An input end of at least one coupler is connected to a coupling end of a corresponding directional coupler of a plurality of directional couplers.

According to a fourth aspect of the present disclosure, an antenna device is provided. The antenna device includes a plurality of antenna radiating elements, a plurality of RF ports and a coupling device coupled between the plurality of antenna radiating elements and the plurality of RF ports. The coupling device includes a plurality of couplers. Each coupler includes a transmission main line and a coupling subline. The transmission main line is used for providing an input end and an output end. The coupling subline is coupled with the transmission main line to provide two coupling ends. The coupling subline includes first and second parts located on opposite sides of the transmission main line and a third part connected between the first and second parts. The coupling sublines of the plurality of couplers are connected in series to provide a first coupling output port and a second coupling output port. The first part of the coupling subline of at least one coupler has a shared section with the third part of the coupling subline of an adjacent coupler. Input ends of the couplers of the coupling device are connected to the corresponding ones of a plurality of RF ports, and output ends of the couplers are connected to the corresponding ones of the plurality of antenna radiating elements.

According to a fifth aspect of the present disclosure, an antenna device is provided. This antenna device includes a plurality of antenna radiating elements, a plurality of RF ports, and a plurality of directional couplers and a coupling device which are coupled between a plurality of radiating units and the plurality of RF ports. The plurality of radiating units, the plurality of RF ports and the plurality of directional couplers correspond to each other on a one-to-one basis. This coupling device includes a plurality of couplers. Each coupler includes a transmission main line and a coupling subline. The transmission main line is used for providing an input end and an output end. The coupling subline is coupled with the transmission main line to provide two coupling ends. The coupling subline includes first and second parts located on opposite sides of the transmission main line and a third part connected between the first and second parts. The coupling sublines of the plurality of couplers are connected in series to provide a first coupling output port and a second coupling output port. The first part of the coupling subline of at least one coupler has a shared section with the third part of the coupling subline of an adjacent coupler. The input end of each of the plurality of directional couplers is connected to a corresponding RF port of the plurality of RF ports, and the output end of each directional coupler is connected to a corresponding radiating unit of the plurality of radiating units, and the coupling end of each directional coupler is connected to the input end of a corresponding coupler of the coupling device.

According to a sixth aspect of the present disclosure, a coupling circuit is provided. The coupling circuit includes a first coupling device. The coupling device includes a transmission line and two coupling lines. The transmission line has a first end to receive signals. The two coupling lines are located on opposite sides of the transmission line and are coupled to the transmission line. An end of each coupling line close to the first end of the transmission line provides a coupled component of the signal.

DETAILED DESCRIPTION

Figure 1:
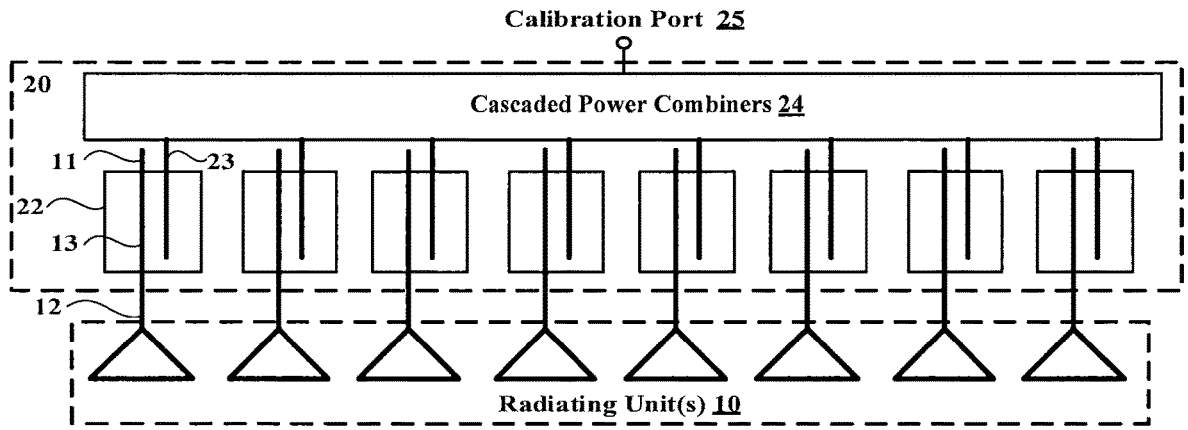
FIG. 1 is a schematic diagram illustrating the basic structure and principle of a prior art calibration device.

The present invention will be described as follows with reference to the accompanying drawings, in which certain embodiments of the present invention are shown. However, it is to be understood that the present invention may be embodied in many different forms and should not be construed as limited to the embodiments that are pictured and described herein. Rather, these embodiments are provided so that this disclosure will be thorough and complete, and will fully convey the scope of the invention to those skilled in the art. It will also be appreciated that the embodiments disclosed herein can be combined in any way to provide many additional embodiments.

Like numbers refer to like elements throughout. In the figures, the thickness of certain lines, layers, components, elements or features may be exaggerated for clarity. Well-known functions or constructions may not be described in details for brevity.

As used herein, the singular forms "a", "an" and "the" are intended to include the plural forms as well, unless the context clearly indicates otherwise. It will be further understood that the terms "comprises" and/or "comprising," specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Embodiments of the present invention provide coupling devices for calibrating an antenna. The coupling device can provide two independent coupling output ports via appropriate connections between a plurality of couplers. The calibration devices according to embodiments of the present invention do not include a plurality of individual directional couplers and cascaded power combiners as in the prior art device of FIG. 1, which reduces the size and cost of the calibration device. Moreover, the two independent coupling output ports can be used for eliminating the path difference caused by the calibration device itself, and thus can detect non-uniformities in amplitude/phase along the transmission/reception paths more accurately.

Figure 2:
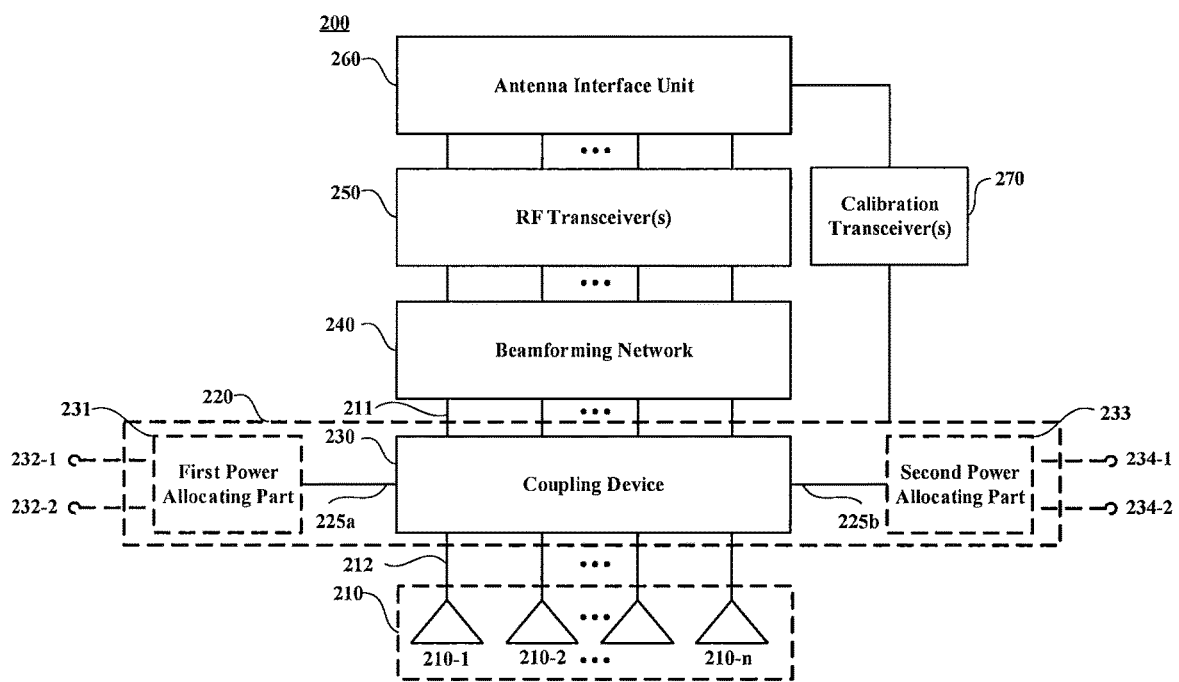
FIG. 2 is a schematic structural diagram of an antenna that includes a coupling device according to an embodiment of the present invention.

Referring now to FIG. 2, a schematic structural diagram of an antenna 200 that includes a coupling device according to an embodiment of the present invention is shown. As illustrated in FIG. 2, the antenna 200 includes an antenna array 210 and a calibration device 220.

The antenna 210 includes a plurality of (e.g., n) radiating units. Each radiating unit 210-1, 210-2, . . . 210-n may include a single radiating element or a plurality of radiating elements (e.g., a column of radiating elements). Each radiating element completes radiation of a transmit signal and performs front-end reception of a receive signal. In the following text, radiating units 210-1, 210-2, . . . 210-n may also be collectively referred to as "radiating unit 210".

The calibration device 220 includes a plurality of signal input ports 211, a plurality of signal output ports 212 that correspond to the signal input ports 211 on a one-to-one basis, and a coupling device 230 that is connected between the signal input ports 211 and the signal output ports 212. The coupling device 230 includes a first coupling output port 225a and a second coupling output port 225b which can provide independent outputs.

The coupling device 230 may operate bi-directionally. At the time of transmission, RF signals (e.g., from a beamforming network or other feeding network) enter the coupling device 230 via the individual signal input ports 211, and are then passed to the corresponding radiating units 210 via the corresponding signal output ports 212. The coupling device 230 collects a portion of the energy of the RF signals transmitted between each signal input port 211 and its corresponding signal output port 212. The collected signal energy can be output from the calibration device 220 via the first coupling output port 225a and the second coupling output port 225b. Preferably, the collected energy is a small part of the energy of the input signals. During normal reception, RF signals from the radiating units 210 may enter the coupling device 230 through the signal output ports 212 and be output from the signal input ports 211; during reception calibration, the calibration test signal may enter the coupling device 230 via the first coupling output port 225a or the second coupling output port 225b and be output from the signal input ports 211. Ideally, there is certain isolation between the signal output ports 212 and the coupling output ports 225a and 225b.

As is further shown in FIG. 2, the antenna 200 may further include a beamforming network 240, RF transceiver(s) 250 and an antenna interface unit 260.

The antenna interface unit 260 includes processors for receiving a digital signal from a baseband unit (not shown) and providing a digitized received signal to the baseband unit. The baseband unit may be a part of a main control system of a base station (not shown). The RF transceivers 250 may perform various signal processing, such as, but not limited to, digital processing, digital-to-analog or analog-to-digital conversion, baseband/intermediate frequency (IF)/RF conversion, low noise amplification and filtering. Beamforming network 240 may comprise phase-shifters or feeding power allocating circuits for applying predetermined gain/phase adjustment to signals of different paths from the RF transceivers and feeding the signals to respective radiating units 210, or for receiving signals from respective radiating units 210 and transferring the signals to respective RF transceivers 250.

When the antenna 200 operates in a transmission mode, antenna interface unit 260 receives a signal to be transmitted from the baseband unit, divides the signal into n identical subcomponents (for example, the number of subcomponents may equal to the number of radiating units 210), applies gain and phase adjustments to each subcomponent, and provides the subcomponents to corresponding RF transceivers 250. The subcomponents are converted into analog RF signals by the RF transceivers 250, and arrive at corresponding radiating units 210 via the beamforming network 240. The RF signals are radiated by the radiating units 210 and the radiated RF signals are interfered and superimposed together to form a desired radiation pattern.

When the antenna 200 operates in a reception mode, each radiating unit 210 receives different subcomponents of the received RF signal. Each subcomponent of the received RF signal is provided to a corresponding RF transceiver 250, converted into a digital subcomponent at the RF transceiver 250 and delivered to antenna interface unit 260. Antenna interface unit 260 applies gain and phase adjustments to the received digital subcomponents, and combines the digital subcomponents to form a composite received signal.

Antenna 200 may perform complicated beamforming manipulation by controlling the gains and phase shifts. For example, the antenna 200 may electronically adjust the beam width, beam shape and pointing direction of the antenna beam by changing the gains (via the power allocating circuits) and the phase shifts (via the phase shifters) in the beamforming network 240.

However, the transmission paths through the antenna 200 may have different propagation characteristics, such that even if the desired gains and phase shifts are applied to the signals traversing each path, the resulting antenna beam may differ from the expected (desired) antenna beam. Moreover, during operation of the smart antenna, relative changes may occur between the different paths. Therefore, it may be necessary to detect, calibrate and compensate for the differences and changes in the transmission characteristics between the paths.

By collecting a portion of the signals on the transmission and reception paths, the calibration device 220 (mainly including a coupling device 230) may be used to calibrate the paths to compensate for non-uniformities in amplitude/phase between individual transmission and reception paths. In some embodiments, the antenna 200 may also include a calibration transceiver 270. The coupling output ports 225a and 225b of the calibration device 220 are coupled to the calibration transceiver 270 via, for example, a RF cable. The calibration device 220 and the calibration transceiver 270 may be used for monitoring the values of the gains and the phases of all the transmission and reception paths so as to be capable of adjusting them. The calibration device 220 may perform initial calibration and continuous monitoring and adjustment during normal use of the antenna 200.

To calibrate the transmission channels, a calibration test signal is transmitted from the antenna interface unit 260 to the radiating units 210. A portion of the energy of the calibration test signal is extracted through the coupling device 230 and is output through the coupling output ports 225a and 225b to the calibration transceiver 270. The calibration transceiver 270 performs an operation similar to the operation of the RF transceiver(s) 250 and measures a composite calibration test signal. The calibration transceiver 270 and/or the antenna interface unit 260 implement an algorithm to determine the necessary adjustments of the gain and the phase of the signals on the transmission paths. Antenna interface unit 260 then carries out the adjustment.

Various algorithms for calibration are already known to a person skilled in the art, and thus will not be further described herein.

In order to calibrate the reception paths, the calibration transceiver 270 transmits the test signal to the coupling output ports 225a and 225b. A portion of the energy of each subcomponent of the calibration test signal is transmitted, via the coupling device 230, to the respective reception paths where the subcomponents are processed by the respective RF transceivers 250 and provided to antenna interface unit 260. Antenna interface unit 260 receives different versions of the calibration test signals from the reception paths and uses a suitable algorithm to change the gain and phase of the signals received from the reception paths in order to form an appropriate antenna beam.

Figure 3:
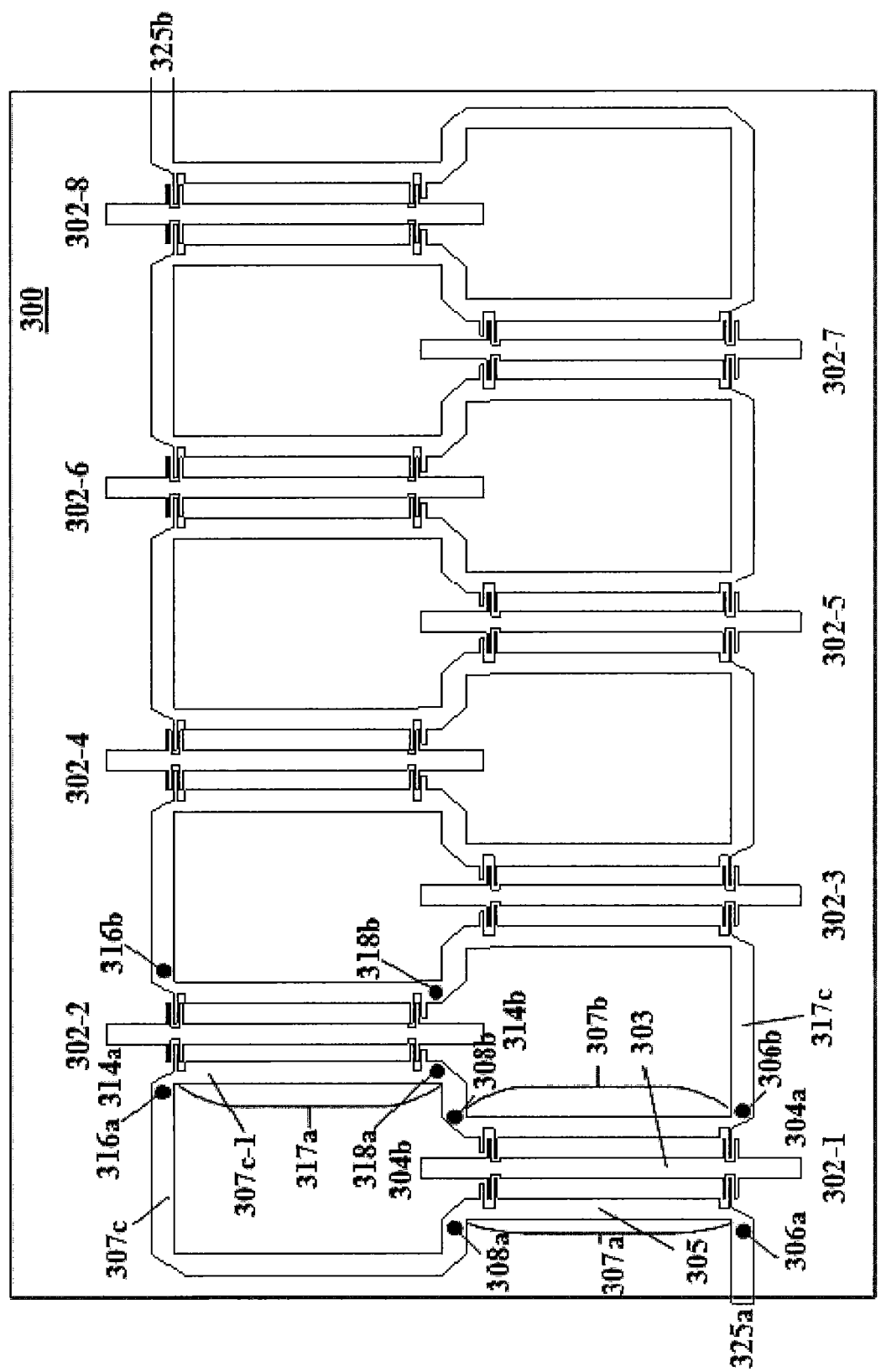
FIG. 3 is a schematic structural diagram of a coupling device according to an embodiment of the present invention.
Figure 4:
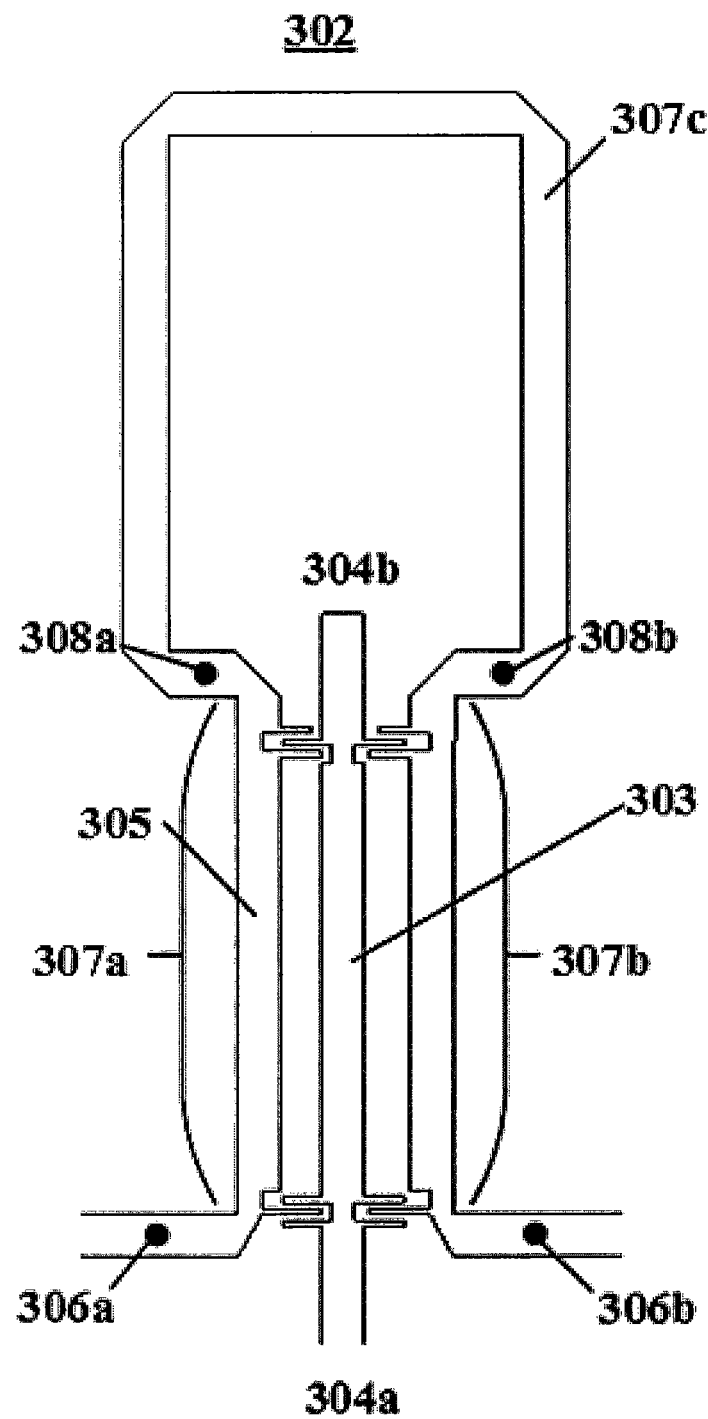
FIG. 4 is an enlarged view of a coupler included in the coupling device of FIG. 3.

FIG. 3 is a schematic structural diagram of a coupling device 300 according to an embodiment of the present invention. The coupling device 300 in FIG. 3 may be used, for example, to implement the coupling device 230 of FIG. 2. The coupling device 300 includes a plurality of couplers. For a smart antenna having eight radiating units 210, the coupling device 300 may include eight couplers 302-1, 302-2 . . . 302-8 that correspond to the eight radiating units 210 on a one-to-one basis. For simplicity, couplers 302-1, 302-2 . . . 302-8 hereinafter may be individually and/or collectively referred to as "coupler(s) 302". In other embodiments, the number of couplers may be more or less than eight couplers 302. FIG. 4 is an enlarged view of one of the couplers 302 that is included in the coupling device 300 of FIG. 3.

As illustrated in FIG. 4, coupler 302 includes a main transmission line 303 and a coupling subline 305. The main transmission line 303 may be used for transmitting signals between a beamforming network (e.g., beamforming network 240 of FIG. 2) and a corresponding radiating unit 210. The input end 304a of the main transmission line 303, which corresponds to signal input port 211 in FIG. 2, may be connected to the beamforming network 240. The output end 304b of the main transmission line 303, which corresponds to signal output port 212 in FIG. 2, may be connected to a radiating unit 210 that corresponds to the particular coupler 302.

The coupling subline 305 includes first and second coupling portions 307a and 307b which each are configured to couple with the main transmission line 303. The first and second coupling portions 307a and 307b may be located on opposite sides of the main transmission line 303. The first and second coupling portions 307a and 307b and the main transmission line 303 may be implemented, for example, using coaxial lines, rectangular waveguides, circular waveguides, strip lines, microstrip transmission lines and/or any other transmission lines. Coupling between the first and second coupling portions 307a, 307b and the main transmission line 303 may be achieved by various known coupling technologies, including but not limited to aperture coupling, parallel coupling, branch coupling and matching double-T. In some embodiments, the coupling subline 305 and the main transmission line 303 may be implemented as edge-coupled microstrip transmission lines, so that the structure of the calibration device is more compact and meets the requirements for miniaturization. In the three-line coupling structure formed by the first and second coupling portions 307a and 307b and the main transmission line 303 that is shown in FIG. 4, 304a is an input end, 304b is an output end, 306a and 306b are coupling ends, and 308a and 308b are isolation ends. A third connection portion 307c of the coupling subline 305 connects the first and second coupling portions 307a and 307b. The shape of the third connection portion 307c is not limited. The electrical length of the connection portion 307c may be designed so that its impedance matches the impedance of the three-line coupling structure. As a result, when a signal is input at the input end 304a, the coupled components of the signal are only transmitted through the coupling ends 306a and 306b, and no power is output on the third connection portion 307c between the isolation ends 308a and 308b.

Returning to FIG. 3, the same reference signs in FIG. 3 and FIG. 4 represent the same components. Firstly, coupling sublines 305 of couplers 302-1 to 302-8 are connected in series and the series connection may be terminated on either end by a first coupling output port 325a and a second coupling output port 325b (corresponding to 225a and 225b in FIG. 2). By connecting the coupling sublines 305 of a plurality of couplers 302 in series, the coupling device 300 may have the following ability: when a signal is injected at the input end 304a of any individual coupler 302-1 to 302-8, two coupled components of the injected signal can always be obtained from the two coupling output port 325a and 325b. The two coupled components are obtained by coupling and transferring the injected signal through two different paths that are independent of each other. For example, when a signal is injected at the input end 304a of coupler 302-5, coupled components are obtained at coupling ends 306a and 306b of the coupler 302-5, respectively. Thereafter, according to the coupling theory, the coupled component at the coupling end 306a sequentially passes through the coupling sublines of couplers 302-4, 302-3, 302-2 and 302-1 to arrive at the coupling output port 325a; the coupled component at the coupling end 306b sequentially passes through the coupling sublines of couplers 302-6, 302-7 and 302-8 to arrive at the coupling output port 325b.

For an individual coupler 302, a first path from the input end 304a to the first coupling output port 325a and a second path from the input end 304a to the second coupling output port 325b will impart different amplitude/phase changes to the signals transferred thereon. However, for all the couplers 302, a sum of the amplitude/phase changes of the first path and the amplitude/phase changes of the second path is fixed. For example, in FIG. 3, the sum approximately equals an amount of change in amplitude/phase caused by the electrical length of the overlapped coupling sublines of the eight couplers. In this way, for the individual transmission paths connected to the corresponding couplers, the amplitude/phase uniformity between these transmission paths can be determined by comparing the difference between the sum values of the coupling output ports 325a and 325b. For the individual couplers 302 in the coupling device 300, it is not necessary to ensure that they have identical circuit structures, since the difference in circuit structures can be eliminated in the calibration algorithm based on the two coupled components at the coupling output ports 325a and 325b. According to the characteristics of signal propagation in the circuit structure, a person skilled in the art knows how to modify the calibration algorithm in the prior art. For example, it is possible to modify the direct comparison of the difference between the output signals from the calibration ports of the individual transmission paths in the prior art as comparison between the sum values of signals from the coupling output ports 325a and 325b of the individual transmission paths. Other details of the calibration algorithm will not be described here.

Secondly, a coupling subline 305 of at least one coupler 302 has a shared section with a coupling subline 305 of an adjacent coupler 302. Specifically, one of the two coupling portions 307a, 307b of the coupling subline 305 of at least one coupler 302 has a shared section with a connection portion 307c of the coupling subline 305 of an adjacent coupler 302. For example, as shown in FIG. 3, coupling portion 307b of the coupling subline 305 of coupler 302-1 serves as at least one part of the connection portion 317c of adjacent coupler 302-2. Since the coupling sublines 305 of adjacent couplers 302 are sequentially connected in series, that is, in an order of 307c, 307b, 317a, 317c, when 307b and 317c have a shared section, 307c and 317a also has a shared section. For example, in FIG. 3, coupling portion 317a serves as a section 307c-1 of connection portion 307c. Accordingly, an isolation end 308a of coupler 302-1 is connected to a coupling end 316a of coupler 302-2, and the other isolation end 308b of coupler 302-1 is connected to the isolation end 318a of coupler 302-2, and a coupling end 306b of coupler 302-1 is connected to an isolation end 318b of coupler 302-2 via the connection portion 317c. In this way, adjacent couplers 302-1 and 302-2 present an interleaved arrangement. That is, the input end 304a of coupler 302-1 and the input end 314a of coupler 302-2 are remote from each other, while the output ends 304b and 314b are close to each other.

When a signal is injected at an input end 304a of coupler 302-1, coupled components are output from coupler 302-1 at the coupling ends 306a and 306b. The coupled component at coupling end 306a may pass to the first coupling output port 325a. The coupled component at coupling end 306b passes to the coupling end 316b of coupler 302-2 along the coupling subline 305 of coupler 302-2, and continues to pass along the serially connected coupling sublines 305 of couplers 302-3 to 302-8 in the same manner so that the coupled component at coupling end 306b of 202-1 is ultimately output through the second coupling output port 325b.

Due to the shared section between the coupling sublines 305 of at least one coupler 302 and its adjacent coupler 302, as compared to using individual couplers, a path from the input end of one coupler to the coupling output port is reduced, which decreases the insertion loss of the coupling output port relative to the input end. This arrangement of couplers is also more compact, further reducing the size of the coupling device 300. A simulation for a specific embodiment of the coupling device 300 indicates that, as compared to using individual couplers, the size of the coupling device 300 is reduced by 44%, and the insertion loss of the coupling ports is reduced by 1.6 dB. In addition, the coupling device 300 can also have improved return loss and coupling flatness.

It should be appreciated that, although FIG. 3 shows that each coupler 302 shares a section of the coupling subline 305 with an adjacent coupler 302, in other embodiments, it is also possible that only one coupler 302 shares a section of the coupling subline 305 with an adjacent coupler 302 while the other couplers 302 still only have their coupling sublines 305 connected in series. Such embodiments also fall within the scope of the present invention.

Returning to FIG. 2, in some embodiments, a first power allocating part 231 is connected to the first coupling output port 225a. The first power allocating part 231 has a plurality of first calibration ports (e.g., calibration ports 232-1 and 232-2 shown in FIG. 2). The first power allocating part 231 may equally divide and/or unequally divide the power of the signals output at the first coupling output port 225a. The number of first calibration ports included in the first power allocating part 231 is not limited to two as shown in FIG. 2. The first power allocating part 231 may be implemented, for example, using any of the following techniques: a 1 to N Wilkinson-type or other type of power splitter, a select-1-from-N switch array, or a circuit or device having similar functionality. In order to reduce the return loss of the first calibration ports relative to the signal input ports 211 of coupling device 230, the first power allocating part 231 may also include a power attenuator.

In a further embodiment, the first power allocating part 231 may include a frequency demultiplexing element. The frequency demultiplexing element splits signals output through the first coupling output port 225a based on frequency such that at least two of the plurality of first calibration ports 232 may output signals in different frequency bands. For example, the first calibration ports 232-1 and 232-2 in FIG. 2 may correspond to different frequency bands, respectively. The frequency demultiplexing element may include filters of various known technologies. In a specific example, a signal from the first coupling output port 225a may be subdivided into two parts by a power divider in the first power allocating part at first. At least one of the output branches may be provided with band pass (or other suitable) filters for different frequency bands. Dividing the signals output by the coupling device by frequency is beneficial when the radiating units in the antenna array are used to support service in multiple frequency bands because it can prevent mutual interference between signals in different frequency bands that are output by the coupling device which might occur during subsequent signal processing. To ensure the uniformity of calibration channels for signals in different frequency bands in the calibration device 220, it is preferable to provide uniform amplitude/phase characteristics to signals transferred on paths from the first coupling output port 225 to respective first calibration ports used for different frequency bands. For example, in FIG. 2, when calibration ports 232-1 and 232-2 are used for different frequency bands, a first path from 225a to 232-1 and a second path from 225a to 232-2 may have mirror-symmetrical circuit arrangements.

A second power allocating part 233 may be coupled to the second coupling output port 225b to be scaled up into a plurality of second calibration ports (e.g., calibration ports 234-1 and 234-2 illustrated in FIG. 2). In some embodiments, the second power allocating part 233 may have a circuit arrangement which is mirror-symmetrical with the first power allocating part 231. When the first power allocating part 231 includes a frequency demultiplexing element, the second power allocating part 233 may also include the same frequency demultiplexing element, such that the plurality of second calibration ports correspond to the respective plurality of first calibration ports. A first calibration port may be used in a pair with a corresponding second calibration port (e.g., 232-1 and 234-1 are used in a pair) for calibrating reception/transmission paths for a particular frequency band. In other embodiments, the second power allocating part 233 may be different from the first power allocating part 231. A first calibration port (such as 232-1) and a second calibration port (such as 234-1) can be used as a pair for calibrating the corresponding reception/transmission paths as long as they are used for the same frequency band.

In some embodiments, the calibration device may also include a plurality of directional couplers in addition to the coupling device. Each directional coupler may include a transmission line and a coupling line that are coupled to each other. The transmission lines may be feed lines for transferring signals between corresponding RF ports of a beamforming network and corresponding radiating elements. A coupling line is used to extract a portion of the signal energy transferred on the feed line and transfer it to the coupling device according to the embodiments of the present invention as described with reference to FIGS. 2-4.

Figure 5:
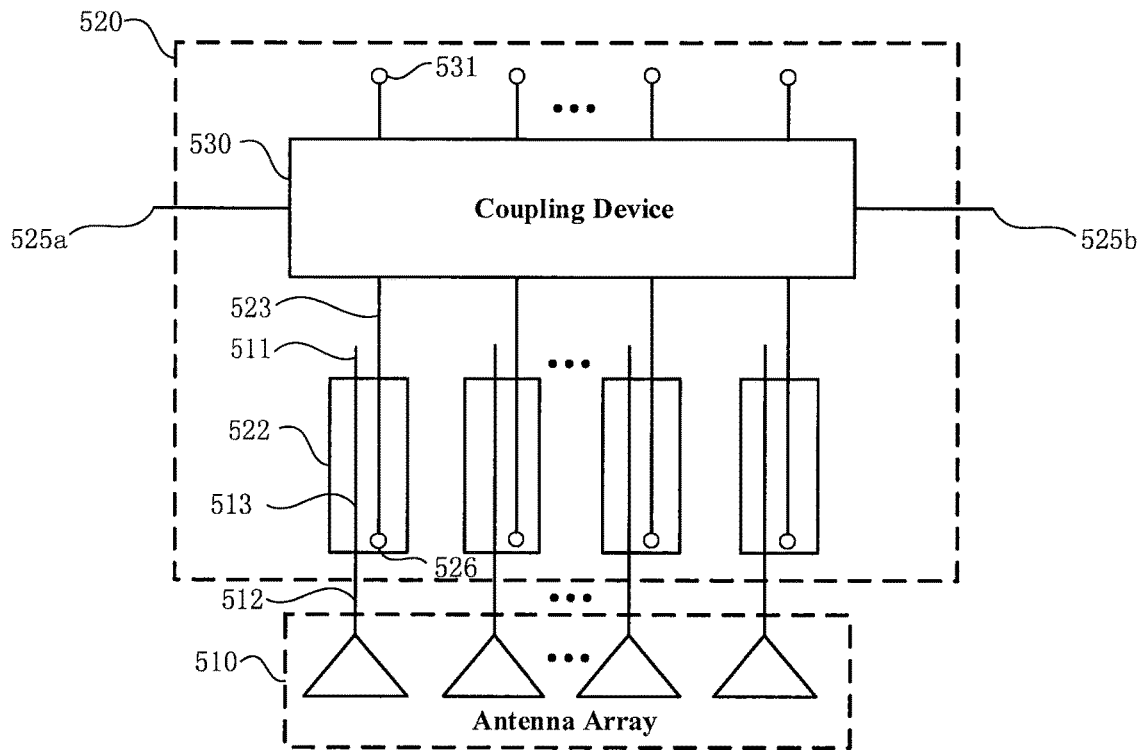
FIG. 5 is a schematic structural diagram of a calibration device according to another embodiment of the present invention.

FIG. 5 is a schematic structural diagram of a calibration device 520 according to a further embodiment of the present invention. Similar to FIG. 2, the calibration device 520 is connected to an antenna array 510 that includes a plurality of radiating units. The specific structure of the antenna array 510 is similar to the antenna array in FIG. 2, and will not be described in detail herein. The calibration device 520 includes a coupling device 530 and a plurality of directional couplers 522. Each directional coupler 522 may be a four-port device, which includes a transmission line 513 and a coupling line that is coupled to the transmission line 513. The two ends of the transmission line 513 are an input end and an output end, respectively. The end of the coupling line that is close to the input end is a coupling end 523, while the opposite end is an isolation end 526. Each directional coupler 522 may be connected to a beamforming network via a signal input port 511 as an input end and with a corresponding radiating unit 510 via a signal output end 512 as an output end. Each transmission line 513 extends between a respective one of the signal input ports 511 and a corresponding signal output port 512, and is a part of a transmission path extending between a RF transceiver and the corresponding radiating unit. The transmission line 513 may be implemented as, for example, a microstrip RF transmission line. Each coupling end 523 is connected to an input port of the coupling device 530 (e.g., connected to an input end 304a of each coupler 302 shown in FIG. 3) for transferring a small part of the energy of the calibration test signal transmitted through each transmission path. The isolation end 526 is connected to a matched load, which may be, for example, a 50 Ohm resistor.

Similar to the coupling output ports 225a and 226b in FIG. 2, the coupling device 530 has a first coupling output port 525a and a second coupling output port 525b. The coupling device 530 may adopt the structure as discussed above with reference to FIGS. 3-4. Each output port 531 of the coupling device (e.g., an output end 304b of each coupler 302 shown in FIG. 3) is connected to a matched load, which may also be, for example, a 50 Ohm resistor.

When there is a reflection signal from a radiating unit 510, since there is a certain degree of isolation between an output port 512 and a coupling end 523 of a directional coupler 522, it is possible to effectively suppress the reflection signal from entering the coupling device 530 and from being output from the coupling output ports 525a and 525b. Therefore, as compared with the coupling device 230 of the calibration device 220 in FIG. 2 which is directly connected between the beamforming network and the radiating units, the calibration device 520 in FIG. 5 can use directional couplers to absorb reflection signals from the radiating units. In addition, since the directional couplers can be located proximate the radiating units, the calibration device 520 can calibrate the entire feed network at the input ports of the radiating units, thereby making the calibration more accurate and effective. In a specific example of a simulated calculation, as compared with the calibration device 220, the coupling accuracy of the coupling device 520 is increased from ±4.85 dB to ±2 dB, and the phase accuracy is increased from ±21° to ±3°.

According to another aspect of the present invention, as a substituted for the Wilkinson power divider, the first power allocating part 231 and/or the second power allocating part 233 of FIG. 2 may use a dual-directional coupler to scale up the coupling output port 225a or 225b of the coupling device 230 into a plurality of calibration ports. When radiating units in the smart antenna are used to support services in two or more frequency bands, the plurality of calibration ports, which are obtained by scaling up, can be used for calibration of the different frequency bands.

Figure 6:
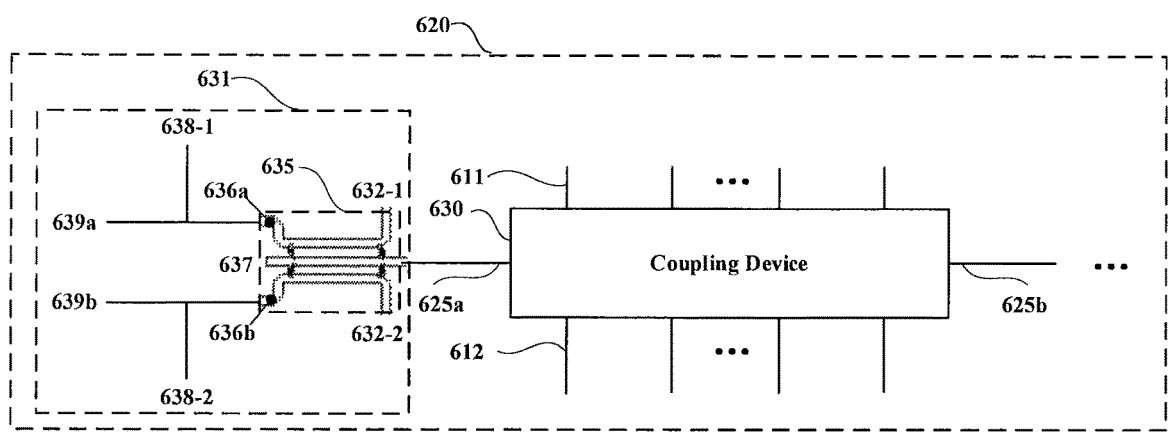
FIG. 6 is a schematic structural diagram of a calibration device which uses dual-directional couplers for scaling up the calibration ports.

FIG. 6 is a schematic structural diagram of a calibration device 620 which employs dual-directional couplers to scale up a calibration port. The calibration device 620 includes a coupling device 630 similar to the coupler device 230 in FIG. 2, which includes a plurality of input ports 611, a plurality of output ports 612 and coupling output ports 625a and 625b. The coupling device 630 may adopt the structure as discussed above with reference to FIGS. 3-4. The calibration device 620 also includes a power distribution portion 631 for scaling up the coupling output port 625a into a plurality of calibration ports 632-1 and 632-2. The power distribution portion 631 includes a dual-directional coupler 635. The dual-directional coupler 635 includes a transmission line that is connected to the coupling output port 625a and two coupling lines that are coupled to the transmission line on opposite sides thereof, thereby having six ports. The through port 637 of the transmission line may be grounded via a matched load end so as to reduce reflection signals that enter the coupling device 630. The matched load may be, for example, a 50 Ohm resistor. In some embodiments, isolation ports 636a and 636b that are adjacent port 637 on two coupling lines may be grounded via a matched load end to avoid interference of the reflection signals. In some embodiments, as illustrated in FIG. 6, isolation ports 636a and 636b may be connected to respective T-shaped bias circuits. The bias signal ports 638-1 and 638-2 of the T-shaped bias circuits are used for applying respective DC bias signals. The ports 639a and 639b may be terminated with fan-shaped traces via matched loads (e.g., 50 Ohm resistors) to allow DC signals to pass and to make high frequency signals virtually grounded. Accordingly, when a RF signal is input from the port 625a and a DC bias signal is applied at the bias signal port 638-1, a composite signal of a coupled component of the RF signal and the DC bias signal will be obtained from the coupling port 632-1. Likewise, a composite signal of a coupled component of the RF signal and the DC bias signal applied via the bias signal port 638-2 will be obtained from the coupling port 638-1.

When a Wilkinson power divider is used, there is a direct connection between the calibration ports 632-1 and 632-2, and DC bias signals added to different calibration ports may cause mutual interference. Therefore, a DC block is usually needed between two calibration ports in practice. In contrast, the use of a dual-directional coupler 635 can prevent DC connections between different calibration ports and achieve better performance than a DC block at a lower cost. In addition, the dual-directional coupler 635 achieves better return loss than the Wilkinson power divider and reduces the size of the calibration device.

It will be appreciated that although FIG. 5 shows that the power distribution circuit 631 is coupled to a coupling device providing two independent coupling output ports according to an embodiment of the present invention, in other embodiments, the power distribution circuit 631 may be connected with calibration ports of various calibration devices in the prior art for scaling up the number of calibration ports.

The foregoing is illustrative of the present disclosure and is not to be construed as limiting thereof. Although exemplary embodiments of this invention have been described, those skilled in the art should readily appreciate that many variations and modifications are possible in the exemplary embodiments without materially departing from the novel teachings and advantages of this invention. Accordingly, all such variations and modifications are intended to be included within the scope of this invention as defined in the claims. The invention is defined by the following claims, with equivalents of the claims to be included therein.

That which is claimed is:

1. A coupling device, comprising:
a plurality of couplers, each coupler including:
a main transmission line having an input end and an output end; and
a coupling subline that is coupled to the main transmission line, the coupling subline including a first part and a second part that are located on opposite sides of the main transmission line and a third part that connects the first and second parts;
wherein the coupling sublines of the plurality of couplers are connected in series to provide a first coupling output port and a second coupling output port,
wherein the first part of the coupling subline of a first coupler of the plurality of couplers has a first shared section with the third part of the coupling subline of a second coupler of the plurality of couplers that is adjacent the first coupler.

2. The coupling device according to claim 1, wherein the third part of the coupling subline of the first coupler has a second shared section with the first part of the coupling subline of the second coupler.

3. The coupling device according to claim 1, wherein the first and second parts of the second coupler are coupled in parallel to the main transmission line of the second coupler on opposite sides thereof, and the third part of the second coupler includes a segment that extends in parallel to the first and second parts, and the first shared section is at least one part of the segment.

4. The coupling device according to claim 1, wherein the electrical length of the third part of the coupling subline of the second coupler of the plurality of couplers is configured to substantially block energy coupled from the main transmission line of the second coupler to the first and second parts of the coupling subline of the second coupler from passing to the third part of the coupling subline of the second coupler.

5. The coupling device according to claim 1, wherein an input end of at least one coupler is connected to a coupling end of a corresponding directional coupler.

6. The coupling device according to claim 5, wherein an output end of the at least one coupler is connected to a matched load.

7. The coupling device according to claim 5, wherein an output end of the corresponding directional coupler is connected to a matched load.

8. An antenna calibration device, comprising:
a first power allocating part, and a coupling device according to claim 1,
wherein the coupling device is connected to the first power allocating part via the first coupling output port, and the first power allocating part has a plurality of first calibration ports.

9. The antenna calibration device according to claim 8, further comprising a second power allocating part, wherein the coupling device is connected to the second power allocating part via a second coupling output port, and the second power allocating part has a plurality of second calibration ports.

10. The antenna calibration device according to claim 8, wherein the first power allocating part includes a frequency demultiplexing element, and at least two of the plurality of first calibration ports are frequency selective ports.

11. The antenna calibration device according to claim 10, wherein paths between the first calibration ports and the first coupling output port have uniform amplitude and phase characteristics.

12. An antenna calibration device, comprising:
a plurality of directional couplers; and
a coupling device according to claim 1,
wherein an input end of at least one coupler of the coupling device is connected to a coupling end of a corresponding directional coupler of the plurality of directional couplers.

13. The antenna calibration device according to claim 12, wherein an output end of the at least one coupler is connected to a matched load.

14. The antenna calibration device according to claim 12, wherein an output end of the corresponding directional coupler is connected to a matched load.

15. An antenna, comprising:
a plurality of radiating units;
a plurality of radio frequency ports;
the coupling device according to claim 1 coupled between the plurality of radiating units and the plurality of radio frequency ports,
wherein the input ends of the couplers of the coupling device are connected to corresponding ones of the plurality of radio frequency ports, and the output ends of the couplers are connected to corresponding ones of the plurality of radiating units.

16. An antenna, comprising:
a plurality of radiating units;
a plurality of radio frequency ports;
a plurality of directional couplers coupled between the plurality of radiating units and the plurality of radio frequency ports, wherein the plurality of radiating units, the plurality of radio frequency ports and the plurality of directional couplers correspond to one another on a one-to-one basis; and
the coupling device is the coupling device according to claim 1,
wherein an input end of each of the plurality of directional couplers is connected to a corresponding radio frequency port of the plurality of radio frequency ports, and an output end of each directional coupler is connected to a corresponding radio unit of the plurality of radiating units, and
a coupling end of each directional coupler is connected to an input end of a corresponding coupler of the coupling device.

17. A coupling device, comprising:
a first coupler that includes a first main transmission line having an input end and an output end and a first coupling subline that is coupled to the first main transmission line, the first coupling subline including a first part and a second part that are located on opposite sides of the first main transmission line and a third part that connects the first and second parts; and
a second coupler that includes a second main transmission line having an input end and an output end and a second coupling subline that is coupled to the second main transmission line, the second coupling subline including a fourth part and a fifth part that are located on opposite sides of the second main transmission line and a sixth part that connects the fourth and fifth parts,
wherein the first and second coupling sublines are connected in series, and
wherein the first transmission line is offset from the second main transmission line in both a first direction and in a second direction that is perpendicular to the first direction.

18. The coupling device according to claim 17, further comprising a third coupler that includes a third main transmission line having an input end and an output end and a third coupling subline that is coupled to the third main transmission line, the third coupling subline including a seventh part and an eighth part that are located on opposite sides of the third main transmission line and a ninth part that connects the seventh and eighth parts, wherein the second and third coupling sublines are connected in series.

19. The coupling device according to claim 18, wherein the third transmission line is offset from the second main transmission line in both the first direction and in the second direction, and is offset from the first main transmission line in only the first direction.

20. The coupling device according to claim 18, wherein the third part of the first coupling subline has a first shared section with the fourth part of the second coupling subline.

* * * * *